United States Patent [19]

Compton et al.

[11] 4,037,473

[45] July 26, 1977

[54] RADIATION PYROMETERS WITH PURGING FLUID

[75] Inventors: William A. Compton; Thomas E. Duffy; Manfred I. Seegall, all of San Diego, Calif.

[73] Assignee: International Harvester Company, San Diego, Calif.

[21] Appl. No.: 501,988

[22] Filed: Aug. 30, 1974

Related U.S. Application Data

[63] Continuation of Ser. No. 181,157, Sept. 16, 1971, abandoned.

[51] Int. Cl.² ............................................. G01J 5/04
[52] U.S. Cl. .................................................... 73/346
[58] Field of Search .................. 73/346, 351, 355 R, 73/355 EM

[56] References Cited

U.S. PATENT DOCUMENTS

| | | | |
|---|---|---|---|
| 2,565,249 | 8/1951 | Machler | 73/355 EM |
| 2,687,611 | 8/1954 | Larsen | 73/355 R UX |
| 3,170,329 | 2/1965 | Prediger et al. | 73/355 R |
| 3,310,356 | 3/1967 | Borberg | 350/63 |
| 3,435,237 | 3/1969 | Collins | 73/355 R X |
| 3,436,965 | 8/1969 | Land | 73/355 R |
| 3,448,283 | 6/1969 | Higley et al. | 250/226 |
| 3,454,769 | 7/1969 | Dynes | 73/355 R X |
| 3,472,497 | 10/1969 | Preszler | 73/351 X |
| 3,584,509 | 6/1971 | Compton et al. | 73/346 |
| 3,623,368 | 11/1971 | Decker | 73/355 R X |
| 3,696,678 | 10/1972 | Mossey | 73/346 |
| 3,759,102 | 7/1973 | Murray | 73/355 R |

OTHER PUBLICATIONS

Bristol-Velotron Two-Color (Ratio) Radiation Pyrometer, The Bristol Company Bulletin p. 1299, Sept. 1965.

*Primary Examiner*—James J. Gill
*Attorney, Agent, or Firm*—Strauch, Nolan, Neale, Nies & Kurz

[57] ABSTRACT

Temperature measuring apparatus of the photometric type having a fiber optics device for conducting radiation to a signal producing detector. Provision is made for a purging fluid at the opposite end of the fiber optics device to keep foreign matter from accumulating.

28 Claims, 11 Drawing Figures

INVENTORS
WILLIAM A. COMPTON
THOMAS E. DUFFY
MANFRED I. SEEGALL

BY Strauch, Nolan, Neale, Nies & Kurz
ATTORNEYS

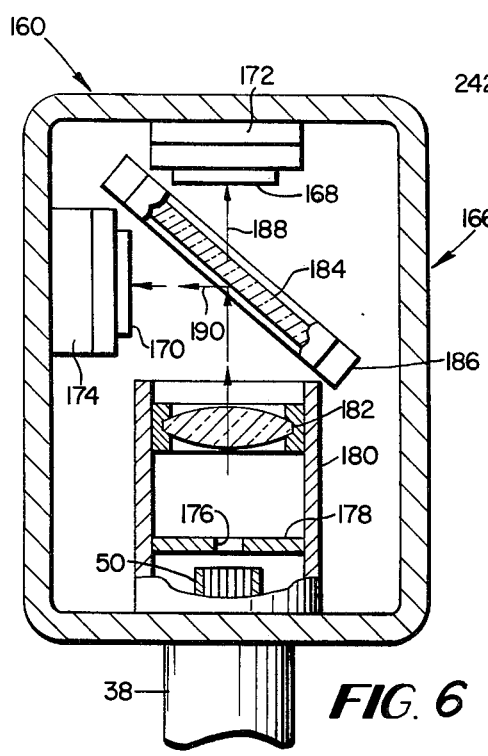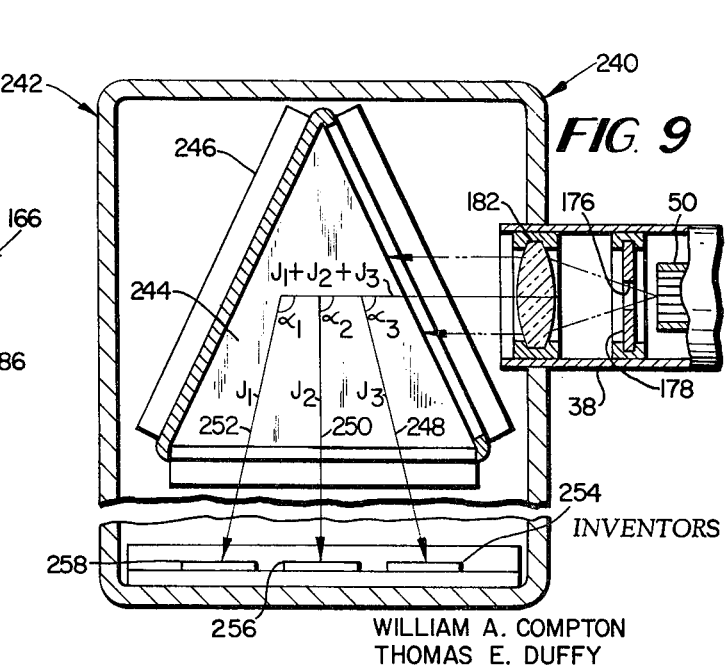

INVENTORS
WILLIAM A. COMPTON
THOMAS E. DUFFY
MANFRED I. SEEGALL

BY *Strauch, Nolan, Neale, Nies & Kurz*
ATTORNEY

RADIATION PYROMETERS WITH PURGING FLUID

This invention relates to temperature measurement and, more particularly, to novel, improved temperature measuring apparatus and to novel, improved methods of measuring temperature.

The novel apparatus and methods of the present invention are of particular value in the measurement of gas turbine blade or bucket temperatures. The principles of the present invention will accordingly be developed primarily by relating them to this application of the invention. However, it is to be understood that the foregoing is but an exemplary application of the novel apparatus and methods described herein and that the ensuring descriptions and discussions are accordingly not intended to limit the scope of the invention.

The greatest promise for increased performance of gas turbine engines lies in the use of higher turbine inlet temperatures in conjunction with compressors having higher pressure ratios since an increase of only 50° F. in the turbine inlet temperature can produced a major increase in the operating efficiency of a turbine engine. However, precise control of turbine blade or bucket temperatues is critical in such engines because, if a typical bucket is operated at a temperature exceeding its maximum rated temperature by as little as 25° F., the useful life of the bucket may be decreased by as much as 50 percent. Therefore, if advantage is to be taken of the efficiency increase obtainable by operation at optimum temperature, precise control of gas inlet and bucket temperatures is essential.

At the present time bucket temperatures are indirectly controlled by thermocouple measurement of the gas leaving the turbine. The thermocouple method does not permit optimum bucket temperatures to be utilized since it has a slow response time and is relatively inaccurate so that a wide safety margin must be maintained. This is because thermocouples are insensitive to small temperature changes and because of temperature streaking; i.e., different portions of the gas stream will impinge on the turbine buckets at different temperatures.

The drawbacks of indirect bucket temperature measurement are well known, and proposals have accordingly heretofore been advanced for measuring bucket temperatures directly in turbine engines. One advanced temperature measuring sytem of this type is disclosed in U.S. Pat. No. 3,584,509 issued June 15, 1971 for TEMPERATURE MEASURING APPARATUS AND METHODS, which is intended to be incorporated by reference herein.

One important and primary object of the present invention resides in the provision of novel devices for measuring temperature which are an improvement over those disclosed in U.S. Pat. No. 3,584,509.

A related and important primary object of the invention resides in the provision of novel, improved methods for measuring the temperature of heated bodies.

The temperature measuring apparatus disclosed in U.S. Pat. No. 3,584,509 includes a gas collimator through which radiant energy emitted from a target area of a body subjected to temperature measurement passes to a photovoltaic detector which generates an electrial signal proportional to the intensity of the radiant energy falling on it. This signal is indicative of the temperature of the body from which the energy is emitted as the intensity of radiant energy emitted from a body is proportional to its temperature. The detector-generated signal is preferably converted to one which has a magnitude proportional to the true temperature of the heated body and which can accordingly be utilized directly to control the flow of fuel to a turbine engine and/or converted to a digital signal to provide a temperature reading, for example.

One characteristic of photovoltaic detectors of the type disclosed in the earlier application is that the response curve of the detector changes as its temperature incrases, i.e., the detector becomes more sensitive to energy of the longer wavelengths as it is heated. One consequence of this is false readings; if the detector temperature changes, the apparatus will indicate a change in the temperature of the body subjected to temperature measurement even though this temperature in actuality remains constant.

In the apparatus disclosed in U.S. Pat. No. 3,584,509, false readings attributable to temperature related changes in the response curve of the detector are avoided by the use of a resistor having a resistance proportional to its temperature in the detector output circuit. This resistor is physically located in the same environment as the detector and accordingly automatically compensates for the effect of ambient temperature changes on the detector.

We have now found that this problem can be even more satisfactorily solved by interposing an appropriate filter in the optical path between the body subjected to temperature measurement and the photovoltaic detector. The optical filter cuts off the longer wavelength photons and keeps them from reaching the detector, which accordingly emits a signal proportional only to the intensity of energy of shorter wavelengths. As this portion of the detector response curve is not affected by the temperature of the detector, the ratio between the intensity of the shorter wavelength energy reaching the detector (which is still proportional to the temperature of the body subjected to temperature measurement) and the magnitude of the detector output signal remain constant if the temperature in the target area does not change, even though the temperature of the detector changes.

One advantage of our novel, improved temperature measuring apparatus as just described is increased accuracy. Other advantages are that the temperature measuring apparatus of the present invention as just described is simpler and more rugged than that described in U.S. Pat. No. 3,584,509.

Yet another aspect of the invention is a novel, improved temperature measuring apparatus in which the interface device can be entirely eliminated. In this version of the invention as applied to a turbine engine, for example, a small slit is formed in the engine casing or housing opposite the turbine bucket or other body subjected to temperature measurement. Radiant energy emitted from the target area of the body passes through the opening in the turbine casing and a slit in the temperature measuring device and impinges on one end of a fiber optics device. This device conducts the impinging energy to a photovoltaic detector as in the temperature measuring device of U.S. Pat. No. 3,584,509, preferably through an optical filter as described above. The detector accordingly generates a signal which can be processed and utilized as discussed above.

Because of the small dimensions of the opening in the turbine casing, sooting is not a problem. This permits the gas collimator or other interface device to be eliminated as discussed above. Accordingly, the temperature measuring apparatus can be made even simpler and more rugged than is possible when an interface device is employed; and it can also be reduced in size. Furthermore, as the detector can be located closely adjacent the exterior of the device in which the object or body subjected to temperature measurement is incorporated and made relatively insensitive to temperature change by using an optical filter or other temperature compensating device, advantage can be taken of the inverse square law to maximize the intensity of the signal falling on the detector.

In many engines, the stationary stators or vanes in the turbine section are made hollow so that air or other cooling fluid can be circulated through them. Another aspect of the present invention resides in the provision of novel, improved temperature measuring apparatus for use in turbine engines as just described or in other applications where a relatively low temperature environment (on the order of 1500° F., for example) can be maintained.

In this version of the present invention, one or more fiber optics bundles or light pipes or the like are installed in the relatively low temperature enviroment (e.g., in the hollow stator) with an end thereof adjacent and facing the target area of an obejct subjected to temperature measurement. Radiation emitted by the latter accordingly impinges on the fiber optics device and can be transmitted to the exterior of the engine or other structure for conversion into an electrical signal indicative of the temperature of the object subjected to temperature measurement in the manner described above.

This type of temperature measuring apparatus has the virtues of other of the devices disclosed herein. It is also versatile in that there is considerable flexibility in the location and orientation of the end of the fiber optics device on which the emitted radiation impinges and, consequently, in the target area of the body subjected to temperature measurement. Yet another important advantage is that there is no disturbance of the fluid flow pattern when the apparatus is used in turbine engine and similar applications.

The temperature measuring apparatus disclosed in U.S. Pat. No. 3,584,509 is of the brightness pyrometer type; that is, the detector output signal is proportional to the intensity of the total incident radiant energy in the range of wavelengths to which the detector will respond (about 0.4 to 1.2 microns for the preferred silicon diode). As discussed in U.S. Pat. No. 3,584,509, the accuracy of this class of device is adversely affected by obstructions in the optical path to the detector, whether by the collection of soot on an optical component of the device or otherwise, as such obstructions cause degradation or attenuation of the radiant energy signal; and the detector output accordingly decreases even though the temperature of the target area remains unchanged. The solution to this problem proposed in U.S. Pat. No. 3,584,509 was the use of a gas collimator to keep foreign matter from collecting as indicated briefly above.

Several alternate solutions to this problem constituting part of the present invention have been discussed above. Yet another aspect of the present invention resides in the provision of novel, improved temperature measuring apparatus in which the presence of soot or other obstructions does not adversely affect the accuracy of the apparatus.

The novel devices referred to in the proceding paragraph combine in a single temperature measuring apparatus both a brightness pyrometer and a multi-color or ratio pyrometer. Multi-color pyrometers are well-known devices and are described, for example, in U.S. Pat. Nos. 2,237,713, issued Apr. 8, 1941; 2,652,743, issued Sept. 22, 1953; 2,674,155, issued Apr. 6, 1954; 2,702,494, issued Feb. 22, 1955; 2,800,023, issued July 23, 1955; 2,927,502, issued Mar. 8, 1960; 3,222,930, issued Dec. 14, 1965; and 3,435,237, issued Mar. 25, 1969.

In multi-color pyrometers, radiant energy signals are split into two or more component signals. Suitable circuitry processes those signals to produce a ratio signal which is indicative of the temperature of the body from which the original radiant energy signal emanated. If the optical path in this type of device becomes obstructed, the signals from which the ratio signal is derived are equally affected. Therefore, the ratio remains the same for a given temperature of the target area even though the aboslute values of the signals from which the ratio signal is obtained may change.

The disadvantage of multi-color pyrometers as described above and in the cited references is that they are relatively insensitive and therefore not suited for turbine engine and other applications where both the detection of small temperature changes and fast response times are required.

The novel temperature measuring apparatus we have invented is normally operated in the brightness mode. Therefore the apparatus responds rapidly and is sensitive to small temperature changes.

The apparatus is periodically calibrated by operating it in the multi-color or ratio mode. Significant decreases in the detector signal resulting from obstruction of the optical path are accordingly detected, and the brightness signal producing circuitry can be recalibrated to correct for the decrease in the detector output signal resulting from obstructions. Thus, errors in temperature measurement which would otherwise result are eliminated.

The novel temperature measuring apparatus of this aspect of the present invention has the advantages of brightness pyrometers. At the same time, circuitry producing the brightness signal can be readily recalibrated while the apparatus is in operation to eliminate the heretofore unavoidable errors associated with the extended use of brightness pyrometers and the accompanying degradation of the radiant energy signal from the target area.

In our novel temperature measuring apparatus as just described, the radiant energy signal may be divided into two components to provide a two-color pyrometer mode of operation or it may be divided into three or more components. The division may be accomplished by using a prism arrangement or by using one or more filters. Other of the innovations discussed above including the interface device, the use of a small aperture and consequent elimination of the interface device, etc. can also be used in such apparatus to improve the efficiency or provide other desirable attributes, if desired.

Primary objects of the invention have been identified above. Other important but more specific objects of the invention include the provision of novel, improved apparatus for measuring temperature:

1. which are characterized by simplicity, ruggedness, compactness, accuracy, and fast response time;

2. which employ photovoltaic detectors and in conjunction therewith components which minimize the error which would otherwise result from changes in the temperature of the detectors;

3. which do not require the use of an interface device along the optical path between the body subjected to temperature measurement and the detector used to generate a signal indicative of the temperature of the body;

4. in which fiber optic devices are utilized to transmit radiant energy directly from the object subjected to temperature measurement to components for converting the radiant energy to a signal indicative of the temperature of the body;

5. which normally operate in a brightness or fullcolor mode and which can be recalibrated during operation to compensate for degradation along the optical path between the body subjected to temperature measurement and the detector which generates the temperature indicative signal;

6. which have a long service life;

7. which are readily serviced;

8. which are comparatively inexpensive;

9. which have various combinations of the foregoing attributes.

Other important objects and advantages and furter novel features of the present invention will become apparent from the foregoing claims and as the ensuing detailed description and discussion proceeds in conjunction with the accompanying drawing, in which:

FIG. 6 is a plan view of the detector unit of a fourth form of temperature measuring apparatus constructed in accord with the principles of the present invention, the external casing of the unit being broken away to show its internal components;

FIG. 9 is a view similar to FIG. 6 of a fifth form of temperature measuring apparatus constructed in accord with the principles of the present invention;

Figure 1:
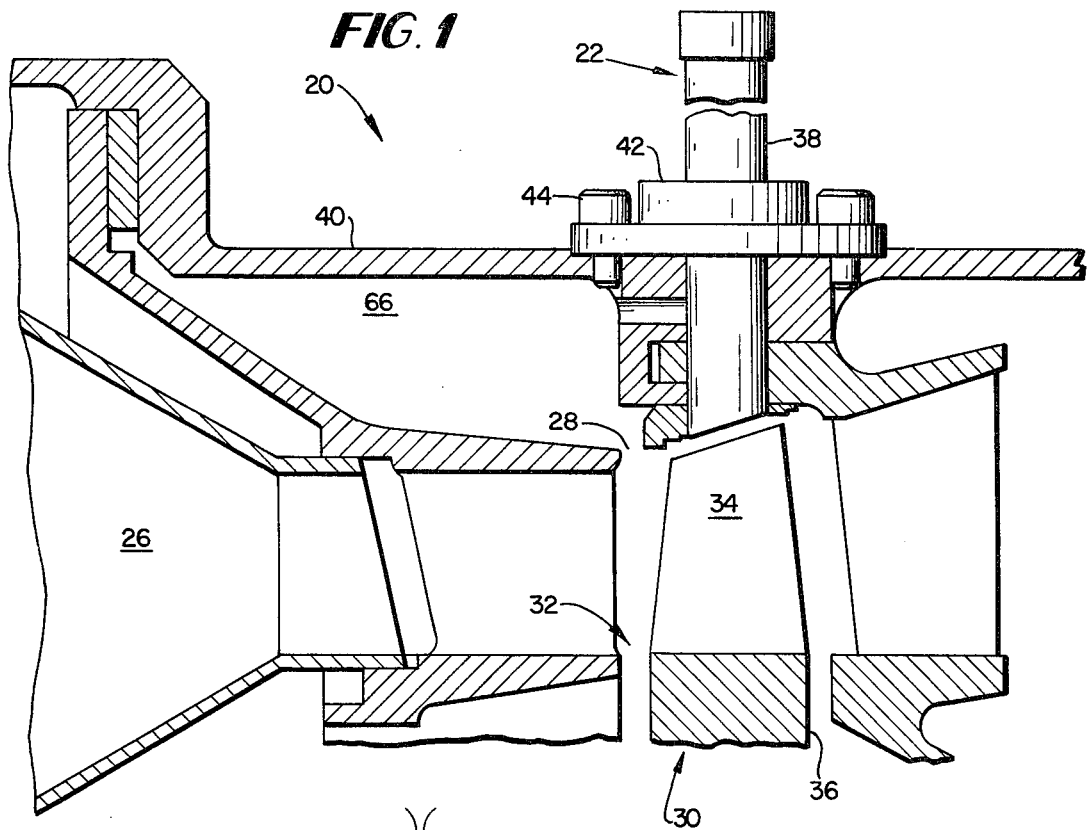
FIG. 1 is a fragmentary side view, largely in section, of a gas turbine equipped with temperature measuring apparatus constructed in accord with the principles of the present invention.
Figure 3:
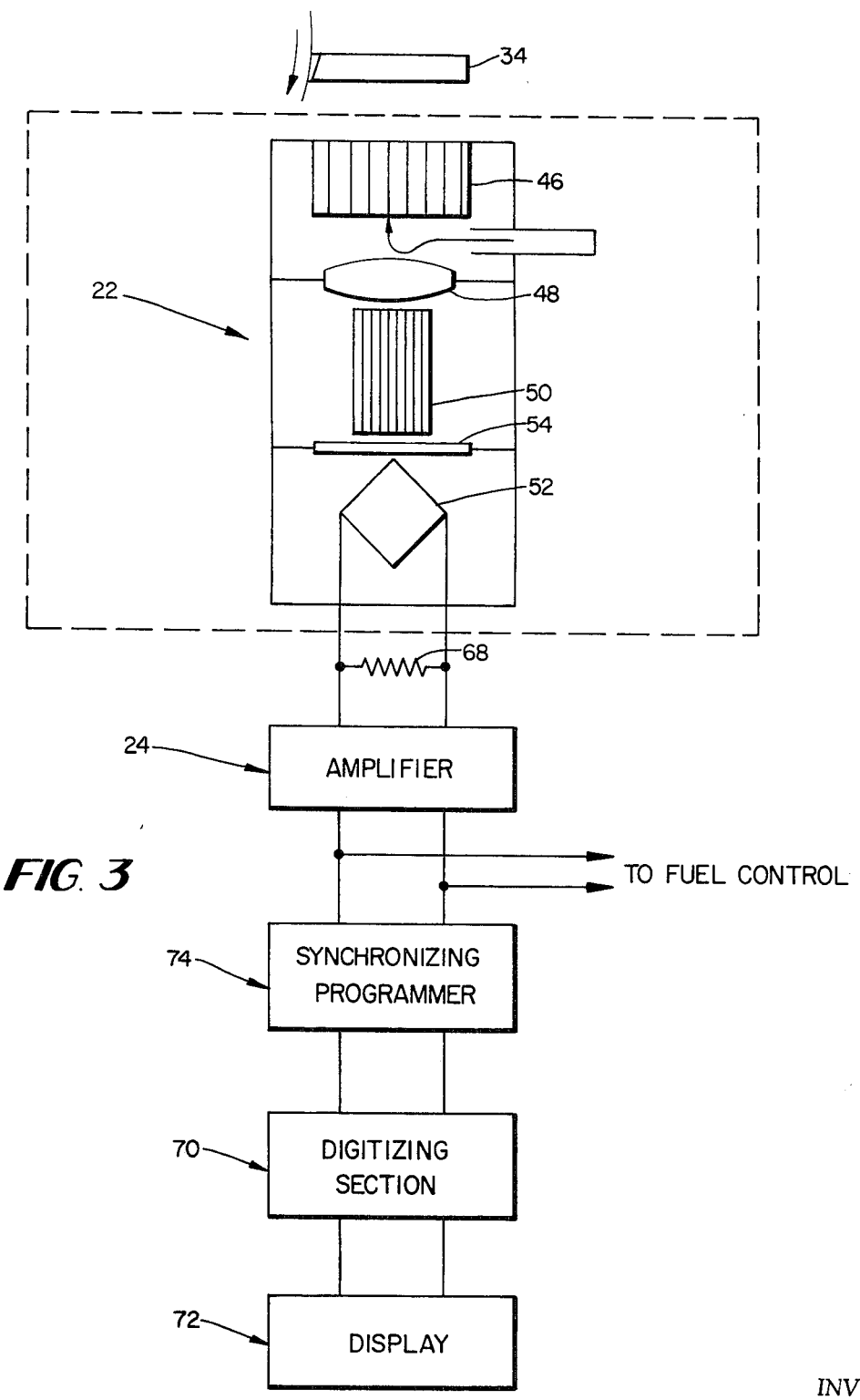
FIG. 3 is a diagrammatic illustration of a system for utilizing a temperature indicative signal generated by the apparatus of FIG. 1.

Referring now to the drawing, FIG. 1 illustrates a gas turbine engine 20 equipped with temperature measuring apparatus 22 in post constructed in accord with and embodying the principles of the present invention. Apparatus 22 produces an electrical signal having a magnitude proportional to the brightness temperature of the monitored engine components; and, in a typical application, this signal is amplified and converted by an analog amplifier 24 (see FIG. 3) to a signal proportional to the true temperature of the monitored components. As shown in FIG. 3, the amplified converted signal can be utilized to regulate the flow of fuel to turbine engine 20 and thereby control the temperature of the monitored components and can also be utilized to provide digital temperature readings.

Turbine engine 20, which is shown in only fragmentary form in FIG. 1, will typically include a compressor section (not shown) from which compressed air flows into a combustion section 26 where fuel is mixed with the compressed air and ignited to heat the air. From the combustion section, the hot compressed air and combustion products flow through inlet 28 into a turbine 30 which includes a wheel 32 consisting of a plurality of turbine blades or buckets 34 fastened to a rotatably mounted shaft 36.

As the hot fluid impinges on the turbine buckets, it rotates the shaft 36 of wheel 32 which is connected to the turbine engine compressor and may also be connected to load equipment such as a generator, propeller, or the like and, in most applications, to auxiliary equipment. Alternatively, the turbine may be employed only to drive the compressor and auxiliary equipment and the hot exhaust gases after passing through turbine 20 directed through an appropriately configured nozzle section to increase their velocity energy and thereby produce thrust capable of propelling an aircraft or other vehicle (an afterburner section is typically positioned ahead of the nozzle section to produce increased thrust).

Gas turbine engines of the type last mentioned (commonly known as turbojet engines) are widely used to propel aircraft. In this application, particularly in supersonic aircraft, it is important that the engines be operated as efficiently as possible, both in commercial aricraft for reasons of economy and in military aircraft to produce maximum performance.

As mentioned above, it is important in obtaining maximum operating efficiencies to maintain the gas inlet temperatures to turbine 30 as high as possible. On the other hand, the maximum established service temperature of the turbine buckets 34 cannot be exceeded as this will result in rapid deterioration of the buckets. It is the function of temperature measuring apparatus 22 to provide an accurate measure of bucket temperature so that these components may be maintained at a temperature which is close to but does not exceed the maximum allowable service temperature.

Figure 2:
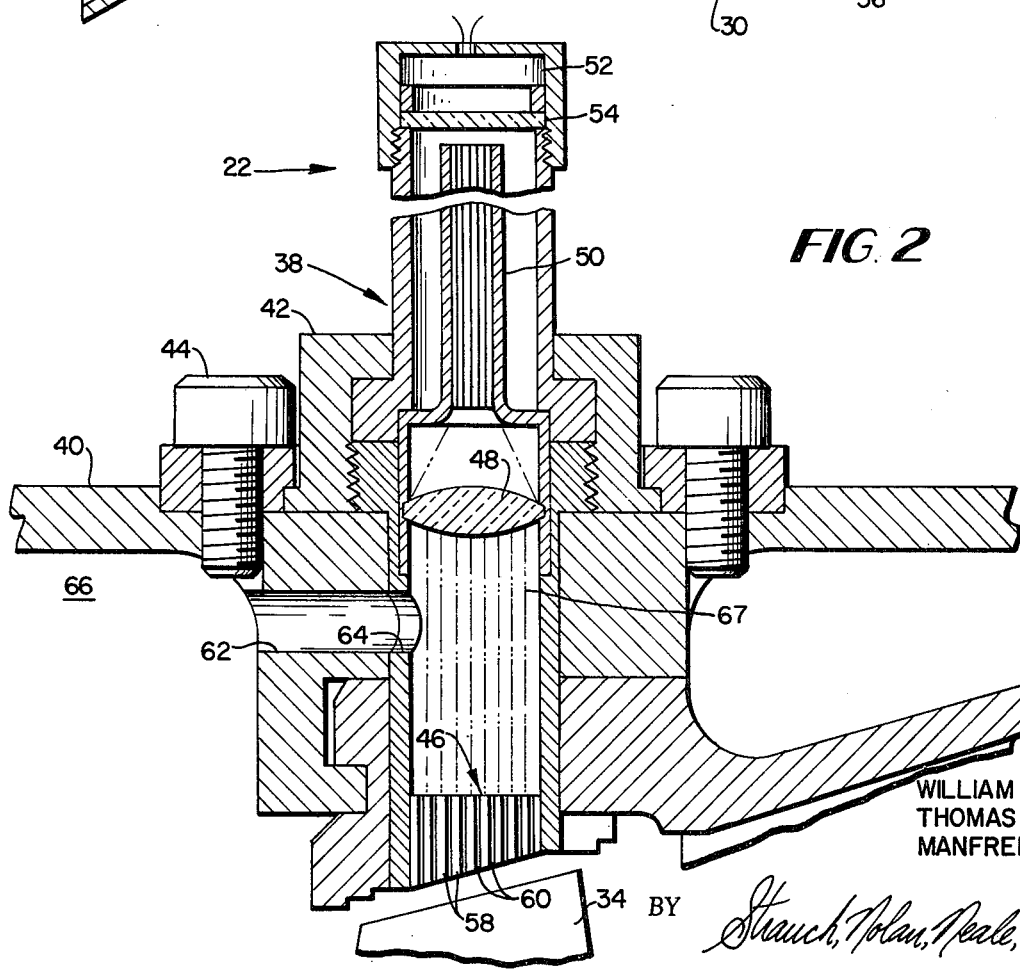
FIG. 2 is a section through the temperature measuring apparatus of FIG. 1.

As best shown in FIG. 2, temperature measuring apparatus 22 includes a casing 38 removably fixed to the housing 40 of turbine engine 20 as by collar 42 and cap screws 44. The major components of the temperature measuring apparatus, all housed in casing 38, are a gas collimator or interface device 46, an objective lens 48, a fiber optics device 50, a silicon diode type photovoltaic detector 52, and an optical filter 54. ("Fiber optics device" is intended to be used in a generic sense herein to include both devices comprised of a bundle of fibers as shown in FIG. 2 and those employing a single radiant energy transmitting member such as the typical sapphire or quartz light pipe as well as equivalent devices). The radiation emitted from the heated target area at the turbine bucket passes through interface device 46 to lens 48, which is employed to provide a seal against the entry of foreign matter and to focus radiant energy transmitted by it onto the end of fiber optics device 50. The fiber optics device conducts the radiant energy through filter 54 to detector 52, causing the detector to generate an electrical signal having a magnitude proportional to the intensity of the radiant energy falling upon it and, accordingly, proportional to the brightness tempearture of the turbine buckets.

The use of the fiber optics device, while not mandatory in all applications, will typically prove to be beneficial since it can be employed to conduct the radiant energy without significant loss to a location 6 or 12 inches or more away from collimator 46. This permits detector 52, which is typically formed of a material having comparatively low heat resistance, to be located far enough from the collimator and the heated components being monitored to prevent overheating and thereby prolong the life of the pyrometer as well as simplifying its maintenance.

This signal may be employed to regulate the flow of fuel to turbine engine 20 and/or digitized to provide a visual reading of the bucket temperature. The signal generated by detector 52 may be so processed as to provide readings of individual bucket temperatures, an average of the temperature of specified groups of turbine buckets, or an average reading of all the buckets as will become apparent hereinafter.

Collimator 46 includes a plurality of open-ended capillary tubes 58 of a reflective, heat resistant material. (Collimators of the type illustrated in FIG. 2 are disclosed in more detail in U.S. Pat. No. 3,584,509). The collimator is mounted in casing 38 in any convenient fashion and typically has its end 60 nearest the object or components being monitored (in this case turbine buckets 34) so configured as to be generally parallel to the target portion of the monitored body or components.

As shown in FIGS. 1 and 2, communicating apertures 62 and 64 are formed in gas turbine engine housing 40 and in temperature measuring apparatus casing 38, respectively. These communicating apertures permit clean, uncontaminated, compressed air to flow from chamber 66 in gas turbine engine 20 into chamber 67 in casing 38 and through the tubes 58 of collimator 46. This air, cools and prevents overheating of the optical temperature measuring components of apparatus 22 and, even more importantly, prevents soot and other foreign material from collecting on the collimator or objective lens 48 and absorbing radiant energy emitted from turbine buckets 34. This is important because the output signal generated by detector 52 and, accordingly, the temperature signal into which the output is converted, is proportional to the intensity of the radiant energy incident on the detector. Accordingly, if part of this energy is absorbed before it reaches the detector, the latter will generate a signal which, when converted, will indicate that the temperature of the component or components being monitored is lower than the actual temperature.

As in the case of collimator 46, lens 48, fiber optics device 50, and detector 52, the purposes for which they are employed, etc. are described in detail in U.S. Pat. No. 3,584,509. These components will accordingly not be described further herein.

The magnitude of the signal produced by a silicon type photovoltaic detector is proportional to the ambient temperature of the environment in which the detector is located. Accordingly, compensation must be provided for changes in the magnitude of the detector output signal attributable to changes in the ambient temperature rather than the intensity of the radiant energy emitted from the object being monitored and falling on the detector. In the embodiment of the present invention shown in FIG. 2, this is automatically accomplished by filter 54.

More specifically, as the temperature of the preferred type of detector 52 increases, its sensitivity of energy of longer wavelengths (typically greater than one micron) also increases. This causes an increase in the detector output and therefore the indicated temperature even though the temperature of the monitored component or components and thus the intensity of the radiant energy impinging on the detector remains constant. It is the function of filter 54 to keep the longer wavelength energy emitted from the component or components subject to temperature measurement from impinging on the detector. The filter, which may be a conventional optical filter, accomplishes this by cutting off and not transmitting energy of a wavelength longer than that which is desired to have reach the detector (again typically on the order of one micron). Accordingly, only the shorter wavelength energy reaches the detector. As the response curve of the silicon type detector is relatively insensitive to energy of this character, the detector output consequently becomes independent of the detector temperature and accurately reflects the actual temperature of the target area even though this temperature changes.

Referring now to FIG. 3, the photovoltaic detector 52 of temperature measuring apparatus 22 is connected to a load device which, as discussed above, will typically be analog amplifier 24, A calibration resistor 68 is normally connected in parallel between the detector and load device to reduce the voltage drop across the load device and thereby facilitate the handling of the detector generated signal.

The amplified signal can be employed to modulate the flow of fuel to turbine engine combustion section 26 and thereby maintain the turbine bucket temperature at a level which will produce maximum efficiency and/or constant power output and other desirable operating characteristics.

Also, the signal can be fed through a digitizing section 70 consisting of analog-to-digital and binary-to-decimal converters of conventional construction and then into a conventional register 72 to provide a digital display of the temperature of the body being monitored. Also, by connecting a conventional synchronizing programmer 74 between the amplifier and digitizing sections, the amplified signal can be picked off at intervals so selected that the temperature which is displayed on reigster 72 will be that of a specific bucket 34, the average temperature of a selected group of buckets, or the average of all the buckets in wheel 32.

Numerous modifications may of course be made in the embodiment of the invention just described without exceeding its scope. A number of such modifications are described in above-incorporated U.S. Pat. No. 3,584,509.

In the embodiments of the invention to hereinafter be described, the components are in some instances the same as those described above in conjuction with the embodiment of FIGS. 1–3. To the extent that this is true, the same reference characters have been employed to identify like components.

Figure 4:
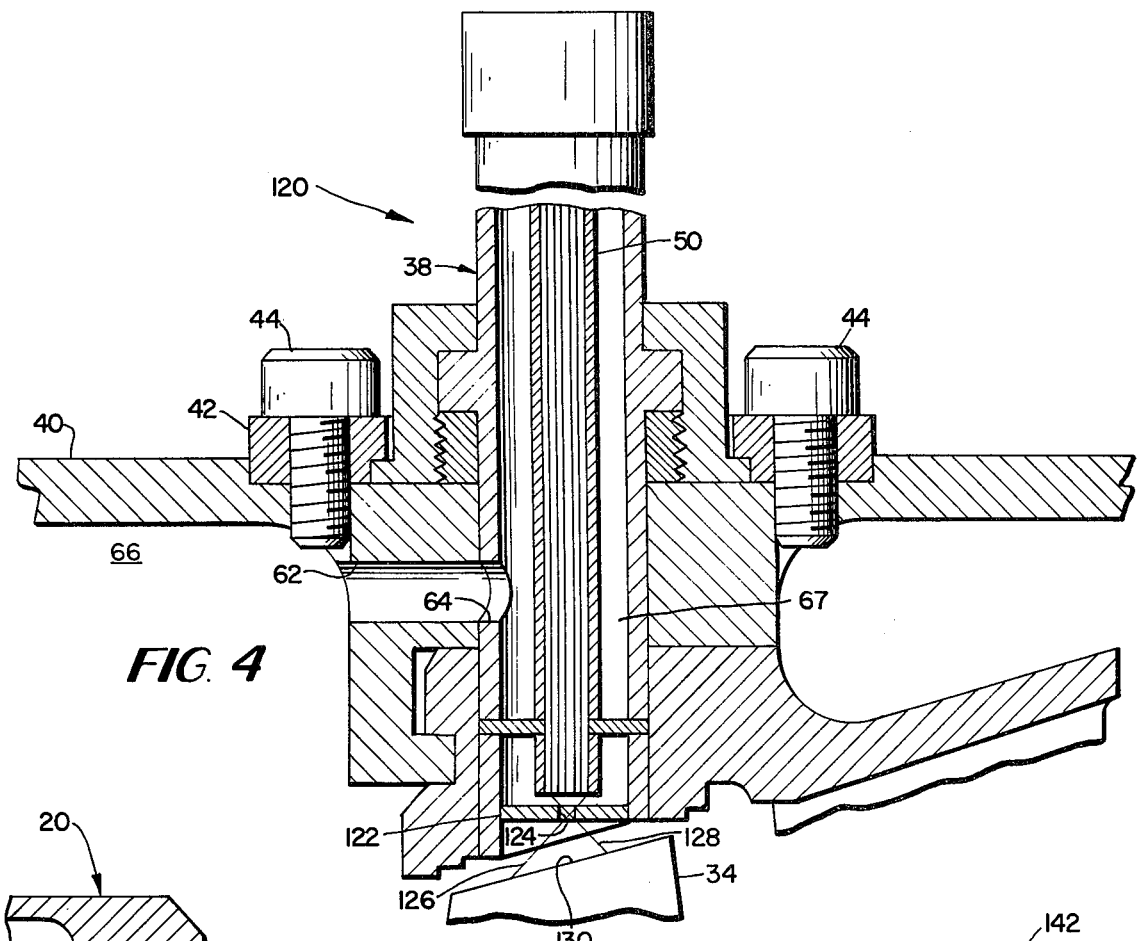
FIG. 4 is a view similar to FIG. 2, but illustrating a second form of temperature measuring apparatus constructed in accord with the principles of the present invention.

Referring again to the drawings, FIG. 4 shows temperature measuring apparatus 120 in accord with the principles of the present invention in which the collimator type interface device has been completely eliminated. In temperature measuring apparatus 120, the interface device is a disc 122 supported in the inner end of casing 38 adjacent the tips of turbine blades or buckets 34. Radiant energy emanating from buckets 34 passes through a slit 124, typically a few thousandths of an inch in width, and enters the inner end of fiber optics device 50. From this point the components and operation of the temperature measuring apparatus are as described above.

In temperature measuring apparatus 120, purge air flows through apertures 62 and 64 into and through chamber 67 and then through slit 124 into the interior of the turbine engine. This keeps foreign material from being deposited on disc 122 in the vicinity of slit 124.

In FIG. 4, reference characters 126 and 128 identify the boundaries of the radiant energy which can pass through slit 124 and impinge upon the fiber optics and, therefore, the size of the target area, which is identified by reference character 130. The size of the target area is dependent upon the width of slit 124 and, also, the distance between the target and the disc 122 in which the slit is formed as well as the acceptance angle of the fiber optics device.

One important advantage of temperature measuring apparatus 120 is that the entry end of fiber optices device 50 can be located closer to the target area than in the embodiments of the invention described above. Advantage can accordingly be taken of the inverse square law to minimize attenuation of the energy emitted from the target area.

Furthermore, this embodiment of the invention has the advantage that it is insensitive to changes in the distance between the aperture, which is fixed, and the target, which may be moving as when it is a turbine bucket, for example. Because of the inverse square law, the intensity of the radiation decreases as the target moves away from the aperture. However, as this occurs, the area of the target from which radiant energy can pass through the aperture increases, cancelling out the decrease attributable to the increasing distance between the aperture and target. The same type of offset, of course, occurs as the target moves closer to the aperture.

Figure 5:
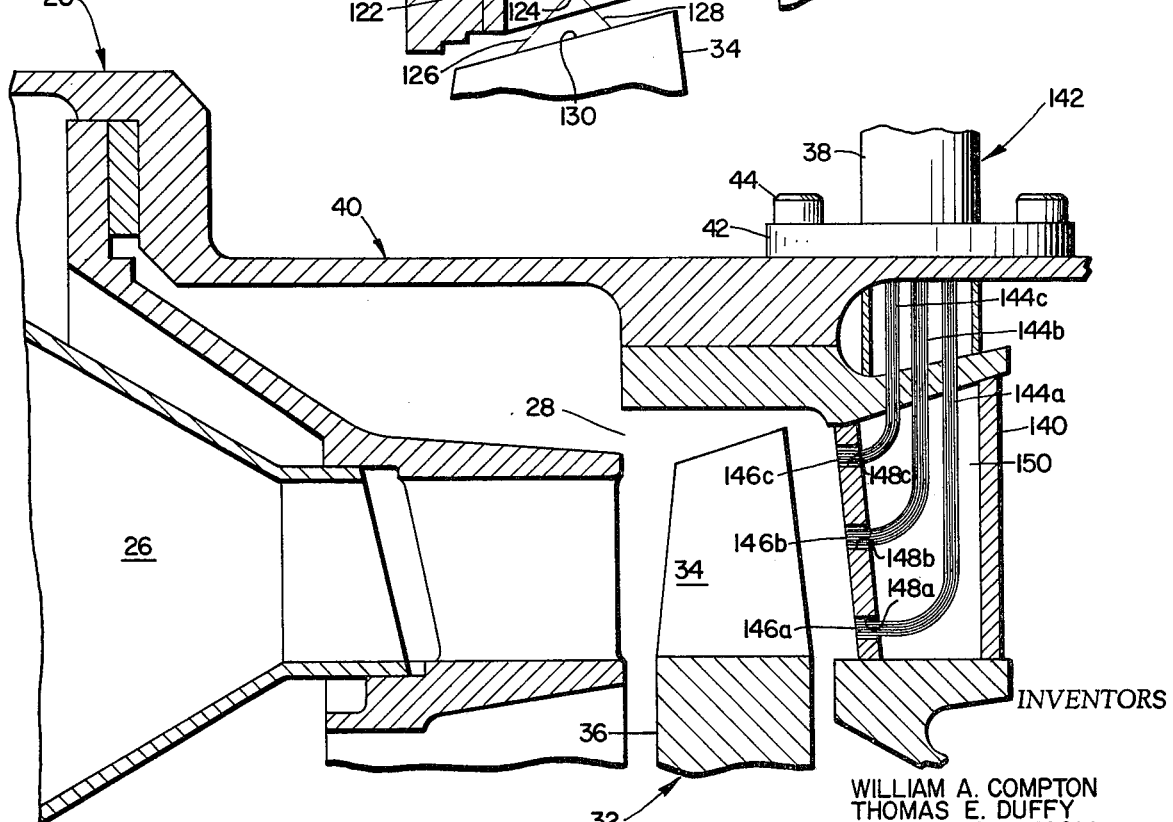
FIG. 5 is a view similar to FIG. 4 of a third form of temperature measuring apparatus constructed in accord with the principles of the present invention.

Many turbine engines, including those of the type illustrated in the drawings thus far described, employ hollow, aircooled stators or vanes of the type identified by reference character 140 in FIG. 5. In this case, a temperature measuring apparatus of the type identified by reference character 142 in FIG. 5 can be employed to advantage. More specifically, in this embodiment of the invention, fiber optics devices 144 a-c are supported in stator 140 in any convenient fashion. The entry ends 146 a-c of the fiber optics devices are disposed in apertures 148 a-c formed in stator 140 and are so located that the entrance ends of the fiber optics devices are opposite the root, mid-section, and tip portions of turbine buckets 34.

Radiant energy emitted from the target areas opposite the fiber optics devices is transmitted through them to components of the type discussed above for the generation of temperature indicative signals. By employing three fiber optics devices, signals indicative of root, mid-section, and tip temperatures can be generated. These signals may be displayed independently or may be fed into a conventional averaging circuit (not shown) to produce an average bucket temperature. Of course, if the degree of refinement provided by employing three target areas is not required, one or two of the fiber optics devices 144 a-c can be eliminated along with the associated signal producing components.

Figure 8:
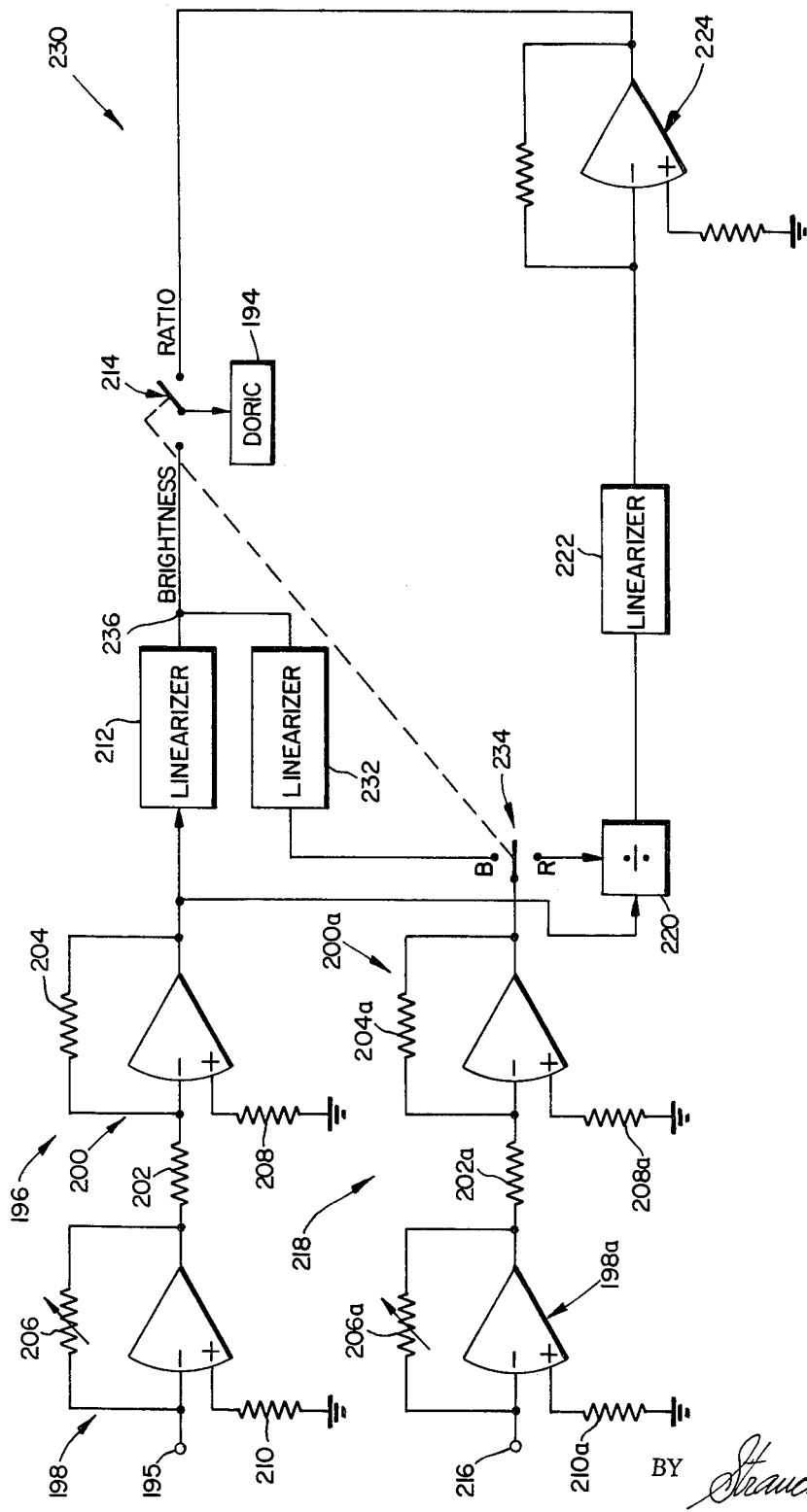
FIG. 8 is a schematic of a second form of signal producing readout circuitry for the apparatus of FIG. 9.

In a turbine engine of the type illustrated in FIG. 8, a continuous circulation of air through the hollow stators is maintained by deflecting cooling air from an appropriate supply source (which, again, may be the compressor section of the engine) through the hollow interior 150 of the stator and out apertures of the type identified in FIG. 5 by reference characters 148 a-c. In engines modified by the addition of temperature measuring apparatus in accord with the principles of the present invention as illustrated in FIG. 5, this air performs two functions in addition to reducing the stator temperature. First, this air keeps the temperature of the fiber optics devices as a sufficiently low level ( typically on the order of 1500° F.) to keep them from being damaged. Also, as the cooling air flows through apertures 148 a-c around the entrance ends 146 a-c of the fiber optics devices, it keeps foreign matter from being deposited on the entrance ends of these devices and attenuating the radiant energy emitted from the target areas into the fiber optics devices.

In each of the embodiments of the invention described above, it has been suggested that the radiant energy emitted from the target area of the component or components subjected to temperature measurement be directed onto a photovoltaic detector capable of generating an output which can be converted into a signal indicative of the target area temperature. FIG. 6 of the drawing illustrates a detector unit 160 which, like those just described, employs photovoltaic detectors capable of producing a signal indicative of the temperature of a target area. However, detector unit 160 has the added advantage that it is self-calibrating.

More specifically, detector unit 160 is a multi- (in this case two-) color optical pyrometer. As discussed briefly above, this type of pyrometer takes advantage of the fact that, if a beam of radiant energy emitted from a body at a given temperature is split into two component signals, the ratio of the magnitudes of the two signals will remain constant even though the radiant energy beam is attenuated and the intensity of the total radiation changes. The ratio does change, however, as the temperature of the radiation emitter changes. Consequently, the ratio signal is indicative of the temperature of the radiation emitter.

As was also indicated above, a number of two-color optical pyrometers which operate in this manner have heretofore been proposed. However, such devices have only limited utility because they are relatively insensitive and have a slow response time, i.e., as shown by curve 162 in FIG. 10, a relatively large change in temperature $\Delta T$ produces only a very small change $\Delta S_1$ in the ratio signal of a multi-color pyrometer.

Figure 10:
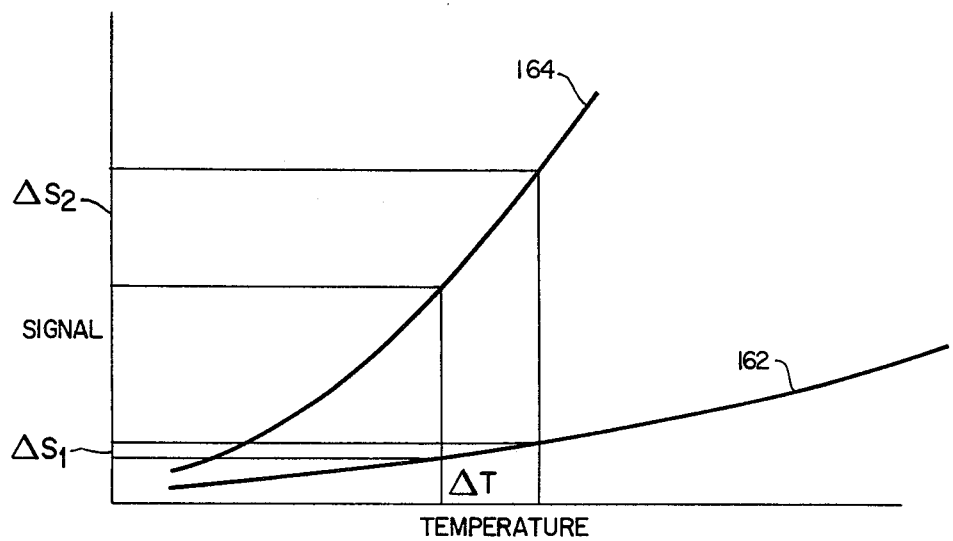
FIG. 10 is a graph showing signal intensity vs. temperature change for temperature measuring apparatus in accord with the invention in each of two different modes of operation.

In contrast, a full-color or brightness pyrometer such as that shown in FIG. 6 is high sensitive and has a fast response time as shown by curve 164 in FIG. 10. The temperature change $\Delta T$ in this case causes a signal change $\Delta S_2$, which is many times larger than $\Delta S_1$.

The major drawback of the brightness pyrometer results from the fact that the output signal is proportional to the total radiant energy falling on its detector component. While this means that such a device is capable of generating a temperature indicative signal (total radiation emitted from a body increases with temperature), it also means that any degradation or attenuation of the radiant energy beam such as by the accumulation of soot or other foreign substances along the optical path between the emitter and detector will result in a reduced output signal and lower indicated temperature even though the temperature of the radiant energy emitter remains constant.

Detector 160 is capable of operating in both a brightness mode and in a two-color or ratio mode with the latter being utilized to calibrate the operation of the device in the brightness mode. Thus, advantage can be taken of the increased sensitivity and faster response time of the brightness mode of operation. Yet, as the output signal suffers degradation, the device can be switched to the two-color mode and recalibrated to compensate for the signal degradation and then returned to the brightness mode of operation.

Another advantage of detector unit 160 is that it can be made extremely small. One actual detector unit of this type has a maximum exterior dimension of only 2 inches.

Referring again to FIG. 6, detector 160 includes a casing 166 housing two photovoltaic detectors 168 and 170, again preferably of the silicon type. The detectors are supported with their radiant energy receiving surfaces at typically right angles by brackets 172 and 174. The interior of the housing is typically painted black to prevent scattering of the radiant energy.

The radiation emitted from the target area of the component or components subjected to temperature measurement may be transmitted to detector unit 160 in any desired fashion; for example, by any of the several arrangements described previously herein or by that described in U.S. Pat. No. 3,584,509. That is, the detector 52 can be used in any of the embodiments so far described; and that detector can in each case be replaced with a detector unit as shown in FIG. 6. Typically, however, the radiant energy gathering and transmitting system associated with the detector will include a fiber optics device for conducting radiant energy from the target area to the detector unit as shown in FIG. 6.

In the particular arrangement shown in FIG. 6, the radiant energy transmitted to the detector unit by fiber optics device 50 passes through a slit 176 in a disc 178 supported in housing 166 by fitting 180. The radiant energy passing through slit 176 then falls on a lens 182 mounted in fitting 180 in spaced relationship to disc 178. Lens 182 focuses the radiant energy onto detectors 168 and 170 through an interference filter 184 supported in housing 166 as by bracket 186, preferably with its surfaces at 45° angles to detectors 168 and 170. (The angles need not be equal but should be in the range of 40°-50°). This causes the radiant energy to be split into two parts which are focused on detectors 168 and 170, respectively.

Interference filter 184 will typically be fabricated of a material having a cut-on wavelength on the order of 0.55 microns and a cut-off wavelength at about 1 micron. Accordingly, part of the radiant energy falling on interference filter 184 will be transmitted through it and impinge on detector 168 as shown by arrow 188 in FIG. 6. The remainder of the radiant energy will be reflected from the filter onto detector 170 as shown by arrow 190. Typically, the filter will be fabricated of a material which will reflect energy in the red and infrared portions of the spectrum and transmit it in the orange to green band; and the larger part of the radiant energy (70% and up) will be reflected by the filter.

Detectors 168 and 170 operate in the usual fashion. That is, each detector generates an output proportional to the magnitude of the radiant energy falling on it. These signals are processed in the circuitry 192 shown in FIG. 7.

This circuitry can be operated in a brightness mode in which the output signal from detector 170 is corrected and transmitted to a readout device 194 to provide a reading indicative of the temperature in the target area. Alternatively, system 192 may be operated in a ratio mode in which one of the two detector outut signals is divided by the other to produce a reading at output device 104 which can be used for calibration purposes.

More specifically, the logarithmic output signal from detector 170 appears at input 195 and is transmitted to a two-stage amplifier 196 consisting of two conventional operational amplifiers 198 and 200 connected in series through a resistor 202, which limits the input current to the second stage amplifier. Amplifier 196 also includes a fixed resistor 204, which establishes a fixed gain bandwidth for the amplified signal and reduces signal distortion, and a variable resistor 206 which can be adjusted to vary the amplifier gain. Conventional D.C. biasing resistors 208 and 210 are also employed in both stages of amplifier 196.

Figure 7:
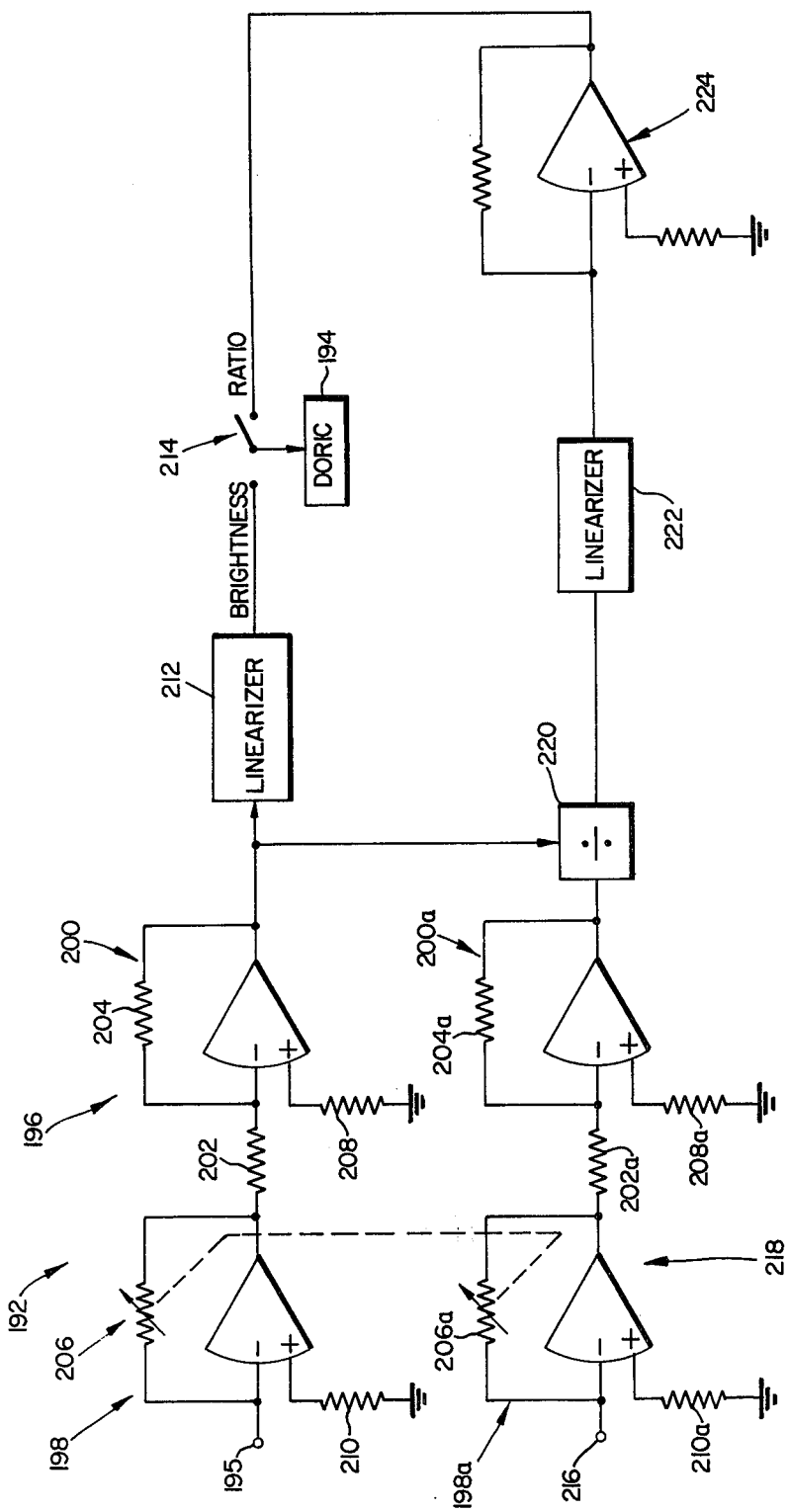
FIG. 7 is a schematic of signal processing and readout circuitry for the temperature measuring apparatus of FIG. 6.

In the brightness mode of operation, the amplified signal from detector 170 is transmitted to a linearizer 212, which is nothing more than a conventional signal shaping circuit. The linearizer converts the amplified loarithmic signal to a linear signal. (If the signal were not linearized, the readout unit would operate on the steep portion of the logarithmic curve, and the readings would change at an unacceptably rapid rate). This signal is transmitted through mode switch 214 to the readout unit 194 to provide a temperature reading and/or is employed as a control signal. As shown in FIG. 7, readout unit 194 can be a conventional digital Doric voltmeter. In this mode of operation, the signal from detector 168 is not utilized.

However, in the ratio or calibration mode of operation, the logarithmic output signal from signal 168, which appears at input terminal 216, is first amplified in a two-stage amplifier 218. The components of this amplifier are identical to those of amplifier 196 and accordingly have been identified by the same reference characters followed by the letter a.

The two amplified logarithmic signals are fed into a conventional voltage divider 220. The output from the voltage divider is accordingly a signal having a magnitude equal to the ratio of the magnitudes of the two detector-generated signals. This output signal, still in logarithmic form, is converted to a linear signal in a linearizer 222 which may be identical to the linearizer 212 described above. The linear signal is amplified in a conventional operational amplifier 224 of the type described previously and transmitted through mode switch 214 to readout unit 194.

For the reasons discussed above, this readout will accurately reflect the temperature of the target area despite degradation of the beam of radiant energy reaching detectors 168 and 170. Accordingly, after the temperature is read, mode switch 214 may be returned to the brightness position and the gain on first-stage operational amplifiers 198 and 198a adjusted by variable feedback resistors 206 and 206a until the temperature indicated by readout device 194 is the same as was obtained by operating the system in the ratio or calibration mode. As shown in FIG. 7, resistors 206 and 206a are ganged so that the gain or the two amplifiers 196 and 218 will remain the same relative to each other even though the gain is changed.

In the system 192 just described, the larger of the two detector-generated signals is employed when the system is employed in the brightness mode. As an alternative, the two detector-generated signals may be summed to produce a brightness or full-color signal. A system 230 capable of operating in this fashion is illustrated in FIG. 8. The components of system 230 are for the most part identical to those of system 192. To the extent that they are, they are identified by the same reference characters.

In addition to those components common to system 192, system 230 includes a third linearizer 232 and a second mode switch 234 which is shown as a separate switch ganged to mode switch 214 in FIG. 8 (in actual practice, only one mode switch of suitable construction would typically be employed).

In the ratio or calibration mode of operation, the operation of system 230 is virtually identical to that of system 192. That is, the output signal from detector 168 appearing at input terminal 195 is amplified in two-stage amplifier 196 and transmitted to voltage divider 220. The outut signal from detector 170 appearing at input terminal 216 is similarly amplified in two-stage amplifier 218 and transmitted through mode switch 234 to the voltage divider unit. Again, as in system 192, the logarithmic output ratio signal from voltage divider 220 is converted to a linear signal in linearizer 222, amplified by operational amplifier 224, and transmitted to readout unit 194.

In the brightness mode of operation, the output signal from detector 168 is handled in the same manner as in system 192. That is, it is amplified in two-stage amplifier 196 and transmitted to linearizer 212 to convert it to a linear signal. The output signal from detector 170 is handled in a similar fashion. That is, it is amplified in two-stage amplifier 218, and then transmitted to linearizer 232 to convert it to a linear signal. The two linear signals are then summed at summing junction 236 and the combined brightness signal transmitted to readout unit 194.

As suggested above, the radiant energy signal emitted from the target area can be split into more than two component signals, if desired. Further, it is not essential that the signal be split by using an interference filter. For example, a prism may be employed for this purpose. A detector unit 240 similar to detector unit 160 but employing a prism type signal splitter and capable of generating three outut signals is shown in FIG. 9 in which components common to it and detector 160 are identified by the same reference characters.

Detector unit 240 includes a housing 242 in which a conventional refracting prism 244 is supported as by bracket assembly 246. In this embodiment of the invention, radiant energy emitted from the target area and transmitted to detector unit 240 through fiber optics device 50 passes through the slit 176 in disc 178 and is focused by lens 182 onto prism 244 which refracts the radiant energy. Component beams or signals are emitted from the prism generally as shown by arrows 248, 250, and 252 and fall on photovoltaic detectors 254, 256, and 258. Again, the detectors are preferably of the silicon type.

The signals generated by the three detectors can be processed in essentially the same manner as those obtained from detector unit 160 to provide a brightness signal (which may be a single one of the detector-generated signals, the sum of any two of these, or all three signals) and a ratio signal. In fact, multiple ratio signals may be generated. A selected one or various combinations of these may be transmitted to the readout unit.

In conjunction with the foregoing, the detector unit of FIG. 8 is automatically temperature compensated. As was discussed in detail above, as the temperature of detectors of the type identified by reference characters 254, 256, and 258 increases, such detectors will accept longer wavelength photons. Thus, the output signals from the detectors will increase even though the temperature of the target area and consequently the the intensity of the emitted energy remain constant.

However, the detectors can readily be located physically in relation to prism 244 in such a manner that only shorter wavelength bands of energy will fall upon them. Accordingly, that the detectors are capable of accepting longer wavelength photons as their temperature increases is of no consequence as those photons do not reach the detectors.

Yet another multi-color optical pyrometer type detector unit in accord with the principles of the present invention is illustrated diagrammatically in FIG. 9 and identified by reference character 260. This device also has a number of components identical to those employed in detector unit 160. Again, to the extent that this is true, common reference characters have been employed.

In this embodiment of the invention, the detector 70 for reflected energy is disposed in parallel relationship to detector 168 and surrounds the exit end of fiber optics device 50. Interference filter 184 is located between and parallel to the two detectors. Radiant energy exiting from fiber optics device 50 falls on the interference filter as in detector device 160. Energy having shorter wavelengths is transmitted through the filter and impinges on detector 168 as indicated by arrows 262. As in the previous embodiment, the longer wavelength energy is reflected onto detector 170 as indicated by arrows 264. Thus, detectors 168 and 170 generate two signals of the same character as those produced by detector unit 160. These signals may accordingly be processed in circuitry of th type illustrated in detail in FIGS. 10 and 11 and identified diagrammatically in FIG. 11 by black box 266.

From the foregoing, it will be apparent to those skilled in the relevant arts that numerous modifications may be made in the exemplary embodiments of the invention described above without exceeding its scope. To the extent that these modifications are not expressly disclaimed in the appended claims, they are fully intended to be covered therein.

Furthermore, it will be apparent to such persons that the novel temperature measuring apparatus described herein may be employed in applications other than that discused above. Such additional applications of the principles of the invention are also fully intended to be covered in the appended claims to the extent that they are not expressly excluded therefrom.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description; and all changes come within the meaning and range of equivalency of the claims are therefore intended to be embraced therein.

What is claimed and desired to be secured by Letters Patent is:

1. Temperature measuring apparatus comprising detector means for generating an electrical signal having a magnitude proportional to the intensity of radiant energy impinging thereon, said detector means comprising a plurality of detectors for generating signals of different characteristics incident to the impingement of the radiant energy thereon; means for conducting radiant energy from a body subjected to temperature measurement to said detector means including an optical component adapted to lie in the optical path between said body and said detector means, said component being capable of transmitting radiant energy impinging thereon; means adapted to be interposed between the optical component and the body subjected to temperature measurement for keeping foreign material from collecting on said component, said last-mentioned means comprising a housing surrounding said optical component, interface means in said housing adjacent said optical component for keeping foreign material from reaching said component, means in said housing on the opposite side of said lastmentioned means from said optical component providing an annular plenum, means providing an inlet to said housing and to said plenum, means providing outlets through which fluid can flow from said plenum into said housing, a first baffle means in said housing for directing fluid exiting through said outlets across said interface means to keep foreign material from collecting thereon, said first baffle means having an aperture through which radiant energy can pass to said interface means, means providing a fluid outlet from said housing along the optical path through which energy emitted from the body subjected to temperature measurement can pass, and a second baffle means in said housing for directing fluid exiting from said plenum first into entraining relationship with the fluid directed across said interface means and then through the outlet from the housing, said second baffle means also being apertured so that radiant energy can pass therethrough to said interface means; and signal processing means having a first mode of operation and a second mode of operation, said signal processing means being operable in said first mode to convert at least one of the signals generated by said detectors to a first signal indicative of the temperature of the body which reflects rapidly and with precision changes in the temperature of the body but is susceptible to being altered by changes in the transmission characteristics along the optical path between the body and the detector means, said signal processing means being operable in said second mode to produce from the signals generated by the detectors a second signal which is also indicative of the temperature of the body, said signal processing means in said second mode of operation having a slower response time than in said first mode, but being capable of producing a signal unaffected by changes in said transmission characteristics, said signal processing means also including means for adjusting the characteristics of the signal produced in the first mode of operation thereof and means for selecting one or the other of the first and second modes of operation, whereby said signal processing means can be operated in said second mode to provide a signal for calibrating the operation of said means and then be put in said first mode of operation and the characteristics of the first signal adjusted relative to the second signal to provide a signal which is calibrated to eliminate the effects of changes in said transmission characteristics and therefore accurately reflects changes in the temperature of the body but which more rapidly reflects said changes in temperature than would said second signal.

2. Temperature measuring apparatus comprising detector means for generating an electrical signal having a magnitude proportional to the intensity of radiant energy impinging thereon; a fiber optics device for conducting radiant energy to said detector means; means having a passage extending therethrough, said fiber optics being disposed in said passage; a member having a single central aperture therethrough in and adjacent one end of said passage, said fiber optics device extending through said passage from said apertured member to said detector means and said apertured member being separated from the end of the fiber optics device thereadjacent only by an airspace, whereby radiant energy emitted from a body subjected to temperature measurement and adjacent the end of the passage in which the apertured member is located can pass through said aperture and be directed by said member onto the end of the fiber optics device and thence conducted to the detector means.

3. Temperature measuring apparatus according to claim 2, together with means providing an inlet to said passage on the side of the apertured member where the fiber optics device is located, whereby fluid can be circulated through said passage and said aperture and out the end of the passage adjacent which the body being subjected to temperature measurement is located to keep foreign matter from collecting on the end of the fiber optics device adjacent said aperture.

4. Temperature measuring apparatus according to claim 2, together with optical filter means between the detector means and the end of the fiber optics device nearest the detector means for keeping from said detector means energy having wavelengths longer than a specified maximum wavelength to thereby make said apparatus insensitive to changes in the temperature of the detector means.

5. The combination of a turbine engine comprising a housing, a wheel rotatably mounted in said housing, a hollow stator means in said housing adjacent said wheel, and means for circulating a fluid through and thereby cooling said stator means with means for measuring the temperature of the turbine wheel comprising detector means for generating an electrical signal having a magnitude proportional to the intensity of radiant energy impinging thereon, said detector means comprising a plurality of detectors for generating signals of different characteristics incident to the impingement of radiant energy thereon; means mounting said detector means exteriorly of said turbine engine housing; means for conducting radiant energy from a target on the turbine wheel to the detector means, said stator means having an aperture therethrough facing said turbine wheel and said radiant energy conducting means comprising a fiber optics device having one end thereof in the aperture through the stator means, said fiber optics device extending through the stator means to the exterior of the turbine housing and terminating at the other end thereof adjacent the detector means, whereby said fiber optics device can be protected against overheating; and signal processing means having a first mode of operation and a second mode of operation, said signal processing means being operable in said first mode to convert at least one of the signals generated by said detectors to a first signal indicative of the temperature of the turbine wheel which reflects rapidly and with precision changes in the temperature of the turbine wheel but is susceptible to being altered by changes in the transmission characteristics along the optical path between the turbine wheel and the detector means, said signal processing means being operable in said second mode to produce from the signals generated by the detectors a second signal which is also indicative of the temperature of the turbine wheel, said signal processing means in said second mode of operation having a slower response time than in said first mode, but being capable of producing a signal unaffected by changes in said transmission characteristics, said signal processing means also including means for adjusting the characteristics of the signal produced in the first mode of operation thereof and means for selecting one or the other of the first and second modes of operation, whereby said signal processing means can be operated in said second mode to provide a signal for calibrating the operation of said means and then be put in said first mode of operation and the characteristics of the first signal adjusted relative to the second signal to provide a signal which is calibrated to eliminate the effects of changes in said transmission characteristics and therefore accurately reflects changes in the temperature of the turbine wheel but which more rapidly reflects said changes in temperature than would said second signal.

6. Temperature measuring apparatus comprising a detector means which includes a plurality of detectors for generating signals of different characteristics incident to the impingement of radiant energy thereon; means for conducting radiant energy from a body subjected to temperature mesurement to said detector means; and signal processing means having a first mode of operation and a second mode of operation, said signal processing means being operable in said first mode to convert at least one of the signals generated by said detectors to a first signal indicative of the temperature of the body which reflects rapidly and with precision changes in the temperature of the body but is susceptible to being altered by changes in the transmission characteristics along the optical path between the body and the detector means, said signal processing means being operable in said second mode to produce from the signals generated by the detectors a second signal which is also indicative of the temperature of the body, said signal processing means in said second mode of operation having a slower response time than in said first mode, but being capable of producing a signal unaffected by changes in said transmission characteristics, said signal processing means also including means for adjusting the characteristics of the signal produced in the first mode of operation thereof and means for selecting one or the other of the first and second modes of operation, whereby said signal processing means can be operated in said second mode to provide a signal for calibrating the operation of said means and then be put in said first mode of operation and the characteristics of the first signal adjusted relative to the second signal to provide a signal which is calibrated to eliminate the effects of changes in said transmission characteristics and therefore accurately reflects changes in the temperature of the body but which more rapidly reflects said changes in temperature than would said second signal.

7. Temperature measuring apparatus according to claim 6, together with means for dividing the radiant energy conducted to said detector means into beams at least equal in number to the number of detectors in said detector means and comprised of energy in different wavelength ranges and for transmitting one of said beams to each of said detectors.

8. Temperature measuring apparatus according to claim 7, wherein the aforesaid means comprises a prism.

9. Temperature measuring apparatus according to claim 7, wherein the aforesaid means includes an optical filter means.

10. Temperature measuring apparatus according to claim 6, wherein the signal processing means comprises means operable in the first mode of operation of the signal processing means to sum the signals generated by the detectors to produce the temperature indicative signal.

11. Temperature measuring apparatus according to claim 6, wherein the signal processing means includes means operable in the first mode of operation of the signal processing means to convert the signal generated by the detectors which has the largest magnitude into the temperature indicative signal.

12. Temperature measuring apparatus comprising first and second detectors for generating first and second signals of different magnitudes incident to the impingement of radiant energy of different characteristics thereon; means for conducting radiant energy from a body subjected to temperature measurement to the vicinity of said detectors; an optical filter means for transmitting that energy in one part of the spectrum to one of said detectors and for reflecting that in another part of the spectrum onto the other of the detectors; and signal processing means having a first mode of operation and a second mode of operation, said signal processing means being operable in said first mode to convert at least one of the signals generated by said detectors to a first signal indicative of the temperature of the body which reflects rapidly and with precision changes in the temperature of the body but is susceptible to being altered by changes in the transmission characteristics along the optical path between the body and the detector means, said signal processing means being operable in said second mode to produce from the signals generated by said first and said second detectors a second signal which is also indicative of the temperature of the body, said signal processing means in said second mode of operation having a slower response time than in said first mode, but being capable of producing a signal unaffected by changes in said transmission characteristics, said signal processing means also including means for adjusting the characteristics of the signal produced in the first mode of operation thereof and means for selecting one or the other of the first and second modes of operation, whereby said signal processing means can be operated in said second mode to provide a signal for calibrating the operation of said means and then be put in said first mode of operation and the characteristics of the first signal adjusted relative to the second signal to provide a signal which is calibrated to eliminate the effects of changes in said transmission characteristics and therefore accurately reflects changes in the temperature of the body but which more rapidly reflects said changes in temperature than would said second signal.

13. Temperature measuring apparatus according to claim 12, wherein said first and second detectors are disposed in parallel, spaced apart relationship; said filter means is disposed between said detectors; and the means for conducting radiant energy to the detectors is a fiber optics device, said device extending through one of said detectors and having an end thereof adjacent said filter means.

14. Temperature measuring apparatus according to claim 12, wherein the detectors are disposed with the radiant energy receiving surfaces thereof at right angles to each other, the filter means being disposed between and at generally equal angles to said detectors.

15. Temperature measuring apparatus according to claim 12, together with a lens between said radiant energy conducting means and said filter means for focusing through said filter means and onto said detectors the radiant energy conducted from the body subjected to temperature measurement by said radiant energy conducting means.

16. Temperature measuring apparatus according to claim 12, wherein the signal processing means comprises means operable in the first mode of operation to convert to the temperature indicative signal the signal generated by the detector onto which radiant energy is reflected by the filter means.

17. Temperature measuring apparatus according to claim 12, wherein said signal processing means comprises means operable to produce the temperature indicative signal by first linearizing the signals generated by the first and second detectors and then summing the linearized signals.

18. Temperature measuring apparatus according to claim 12, wherein the signal processing means includes an amplifier means for amplifying the signal to be converted to the temperature indicative signal and wherein the means for adjusting the characteristics of said last-mentioned signal includes means for adjusting the gain of said amplifier means.

19. Temperature measuring apparatus according to claim 12, wherein the means for conducting the radiant energy from the body subjected to temperature measurement to the detectors comprises a fiber optics device having one end adjacent said detector means and a lens in the optical path between the body subjected to temperature measurement and the fiber optics device for focusing radiant energy emitted from said body onto the other end of the fiber optics device, said apparatus further including means adapted to be between the lens and the body subjected to temperature measurement for keeping foreign material from collecting on said lens.

20. Temperature measuring apparatus according to claim 19, wherein the means for keeping foreign material from collecting on said lens comprises a housing surrounding said lens; an interface device providing a plurality of elongated passages disposed in said housing with said passages paralleling the optical path of the radiant energy so that said energy can pass therethrough to the lens without substantial impediment; and means providing an inlet to said housing between said lens and said interface device, whereby fluid can be circulated through said housing to keep foreign material away from said lens and then exhausted from said housing through said interface device.

21. Temperature measuring apparatus according to claim 12, wherein the means for keeping foreign material from collecting on said lens comprises a housing surrounding said lens; an interface window in said housing adjacent said lens for keeping foreign material from reaching said lens; means in said housing on the opposite side of said window from said lens providing an annular plenum; means providing an inlet to said housing and to said plenum; means providing outlets through which fluid can flow from said plenum into said housing; a first baffle means in said housing for directing fluid exiting through said outlets across said interface window to keep foreign material from collecting thereon, said first baffle means having an aperture through which radiant energy can pass to said window; means providing a fluid outlet from said housing along the optical path through which energy emitted from the body subjected to temperature measurement can pass; and a second baffle means in said housing for directing fluid exiting from said plenum first into entraining relationship with the fluid directed across said interface window and then through the outlet from the housing, said second baffle means also being apertured so that radiant energy can pass therethrough to said interface window.

22. Temperature measuring apparatus according to claim 12, wherein the means for conducting radiant energy to the detectors comprises a fiber optics device having one end adjacent said detectors and the other end adjacent the body subjected to temperature measurement; a housing surrounding said fiber optics device, said housing having an end wall through which radiant energy emitted from said body can pass and impinge on the end of the device nearest the body; and means providing an inlet to said housing, whereby fluid can be circulated through said housing and out said aperture to keep foreign matter from collecting on the end of the fiber optics device adjacent said aperture.

23. The combination of a turbine engine including a housing and a component in said housing with means for measuring the temperature of said component, said temperature measuring means comprising casing means; means fixing said casing means to the exterior of said turbine engine housing; detector means comprising a plurality of detectors for generating signals of different characteristics incident to the impingement of radiant energy therein in said casing means exteriorly of the turbine engine housing; means providing an optical path for radiant energy emitted from said turbine engine component through said turbine engine housing and said casing means to said detectors; and signal processing means having a first mode of operation and a second mode of operation, said signal processing means being operable in said first mode to convert at least one of the signals generated by said detectors to a first signal indicative of the temperature of the turbine engine component which reflects rapidly and with precision changes in the temperature of the turbine engine component but is susceptible to being altered by changes in the transmission characteristics along the optical path between the turbine engine component and the detector means, said signal processing means being operable in said second mode to produce from the signals generated by the detectors a second signal which is also indicative of the temperature of the turbine engine component, said signal processing means in said second mode of operation having a slower response time than in said first mode, but being capable of producing a signal unaffected by changes in said transmission characteristics, said signal processing means also including means for adjusting the characteristics of the signal produced in the first mode of operation thereof and means for selecting one or the other of the first and second modes of operation, whereby said signal processing means can be operated in said second mode to provide a signal for calibrating the operation of said means and then be put in said first mode of operation and the characteristics of the first signal adjusted relative to the second signal to provide a signal which is calibrated to eliminate the effects of changes in said transmission characteristics and therefore accurately reflects changes in the temperature of the turbine engine component but which more rapidly reflects said changes in temperature than would said second signal.

24. The combination of a turbine engine comprising a housing, a wheel rotatably mounted in said housing, a stator means having a hollow interior and located in said housing adjacent said wheel, and means for circulating a fluid through the interior of and thereby cooling said stator means with means for measuring the temperature of the turbine wheel comprising detector means for generating an electrical signal having a magnitude proportional to the intensity of radiant energy impinging thereon; means mounting said detector means exteriorly of said turbine engine housing; and means for conducting radiant energy from a target area on the turbine wheel to the detector means, said stator means having an aperture therethrough facing said turbine wheel and communicating with the hollow interior of the stator means and said radiant energy conducting means comprising a fiber optics device having one end thereof in the aperture through the stator means, said fiber optics device extending from said aperture through the hollow interior of the stator to the exterior of the turbine housing and terminating at the other end thereof adjacent the detector means, whereby said detector means can be protected against overheating, and the aperture in which the fiber optics device is disposed being larger than said device, whereby there is a flow passage between said device and the stator means through which fluid circulated to the interior of the stator means can flow to keep foreign material from collecting on the end of the fiber optics device in said aperture.

25. A combination according to claim 24, wherein there are a plurality of apertures as aforesaid in said stator means and a fiber optics device disposed in each of said stator means, said apertures being at different distances from the center of rotation of the turbine wheel, whereby the temperatures of plural target areas on said turbine wheel can be simultaneously measured.

26. A combination according to claim 24, wherein the temperature measuring apparatus further includes optical filter means between said detector means and the end of the fiber optics device thereadjacent for keeping from said detector means energy having wavelengths longer than a specified maximum wavelength and thereby making said apparatus insensitive to changes in the temperature of the detector means.

27. Temperature measuring apparatus comprising detector means for generating an electrical signal having a magnitude proportional to the intensity of radiant energy impinging thereon; a fiber optics device for conducting radiant energy to said detector means; a member having a single central aperture therethrough adjacent one end of said fiber optics device, said fiber optics device extending from said apertured member to said detector means and said apertured member being separated from the end of the fiber optics device thereadjacent only by an airspace, whereby radiant energy emitted from a body subjected to temperature measurement can pass through said aperture and be directed by said member onto the end of the fiber optics device and thence conducted to the detector means.

28. The combination of a turbine engine comprising an apertured housing and a wheel rotatably mounted in said housing with means for measuring the temperature of said wheel, said temperature measuring means comprising detector means for generating an electrical signal having a magnitude proportional to the intensity of radiant energy impinging thereon; a fiber optics device for conducting radiant energy to said detector means; a member having an aperture therethrough, said member being located adjacent one end of said fiber optics device with the aperture therethrough aligned with the aperture in said housing, said fiber optics device extending from said apertured member to said detector means, and said apertured member being separated from the end of the fiber optics device thereadjacent only by an airspace, whereby radiant energy emitted from said wheel can pass seriatim through the apertures in said housing and in said apertured member and be directed by said member onto the end of the fiber optics device and thence conducted to the detector means.

* * * * *

UNITED STATES PATENT OFFICE
CERTIFICATE OF CORRECTION

Patent No. 4,037,473            Dated July 26, 1977

Inventor(s) William A. Compton; Thomas E. Duffy; Manfred I. Seegall

It is certified that error appears in the above-identified patent and that said Letters Patent are hereby corrected as shown below:

Column 2, line 11, change "incrases" to --increases--.

Column 5, line 53, change "Fig. 9" to --Fig. 6--.

Column 8, line 8, change "of" (second occurrence) to --to--.

Column 12, line 13, change "104" to --194--.

Column 14, line 8, change "Fig. 8" to --Fig. 9--.

Column 14, line 14, omit "the" (first occurrence).

Figure 11:
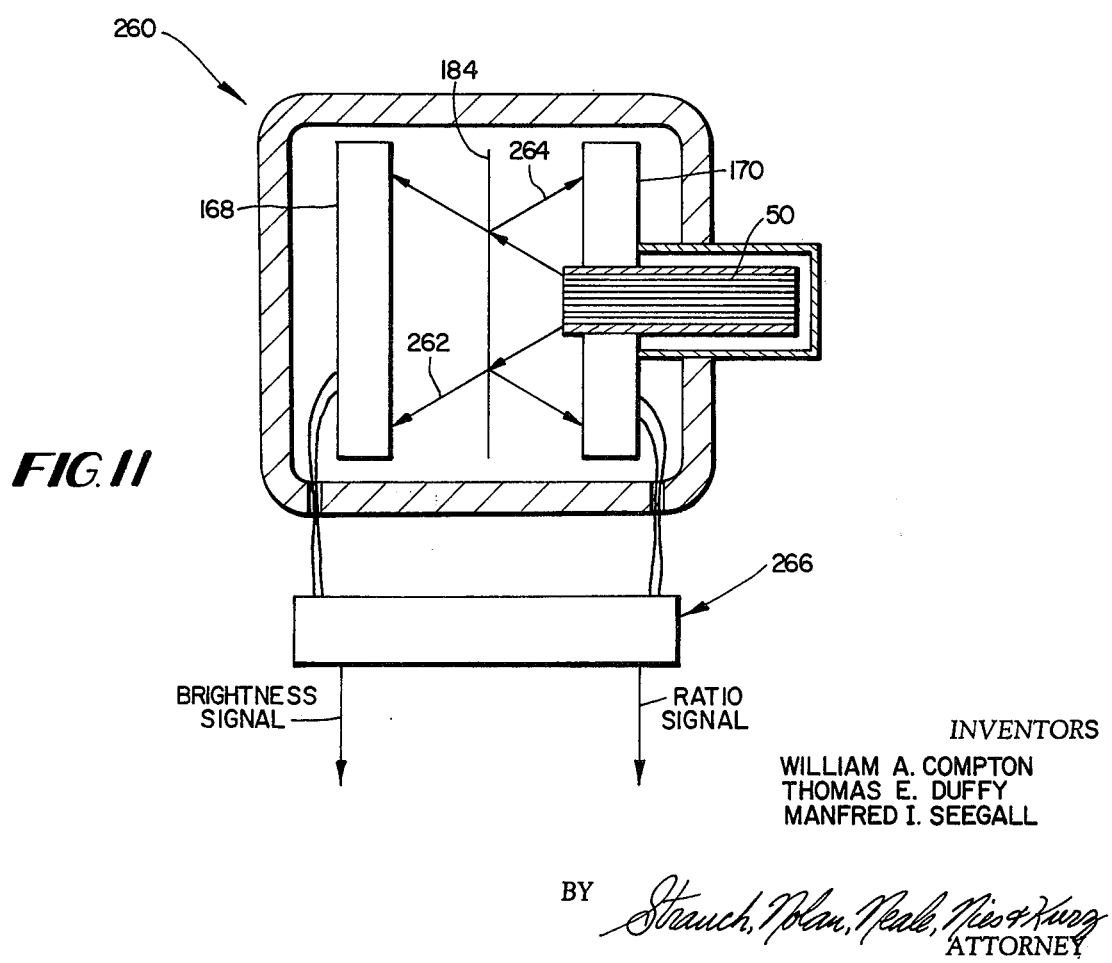
FIG. 11 is a view similar to FIG 6 of a sixth form of temperature measuring apparatus in accord with the principles of the present invention.

Column 14, line 25, change "Fig. 9" to --Fig. 11--.

Column 14, line 31, change "70" to --170--.

Column 14, line 46, change "Figs. 10 and 11" to --Figs. 7 and 8--.

Signed and Sealed this

Seventeenth Day of January 1978

[SEAL]

Attest:

RUTH C. MASON
*Attesting Officer*

LUTRELLE F. PARKER
*Acting Commissioner of Patents and Trademarks*